Dec. 3, 1968  D. K. ANAND  3,414,050
HEAT PIPE CONTROL APPARATUS
Filed April 11, 1967  3 Sheets-Sheet 3
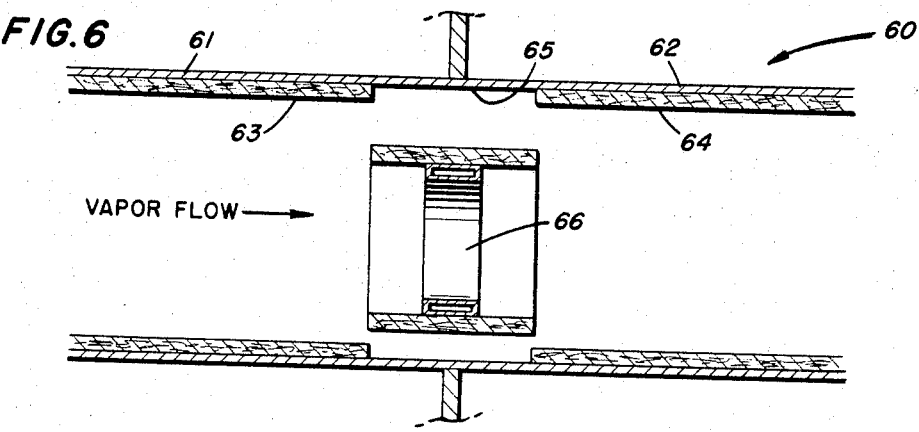
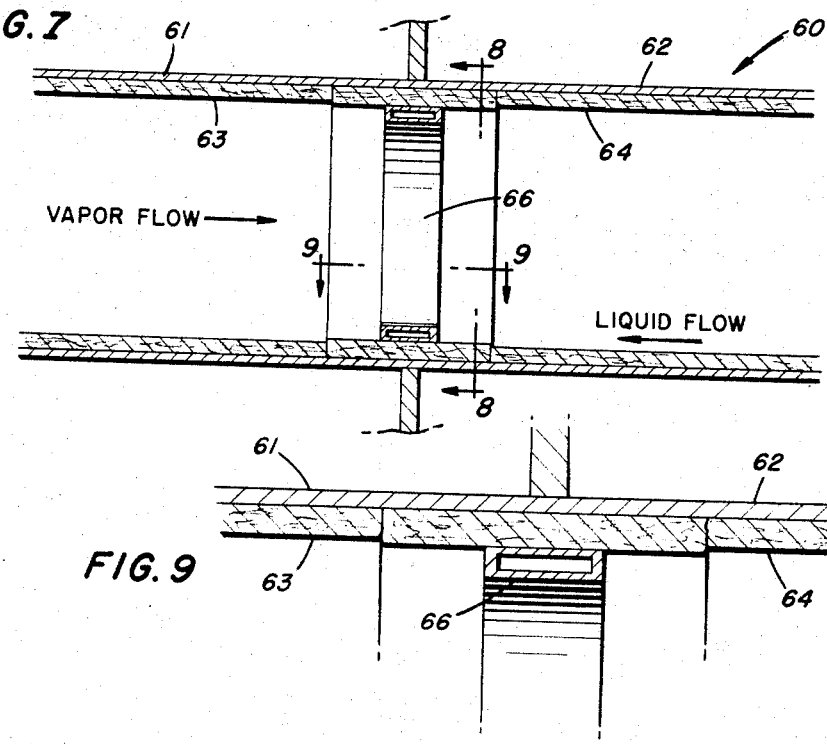
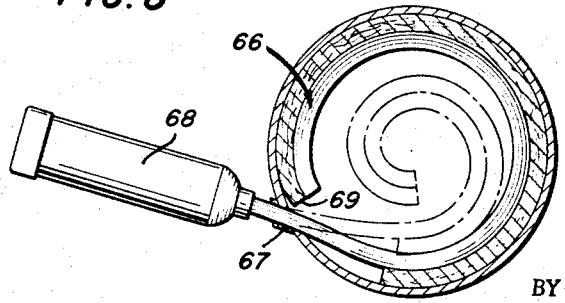
DAVINDER K. ANAND
INVENTOR
BY J. O. Tresansky
ATTORNEY

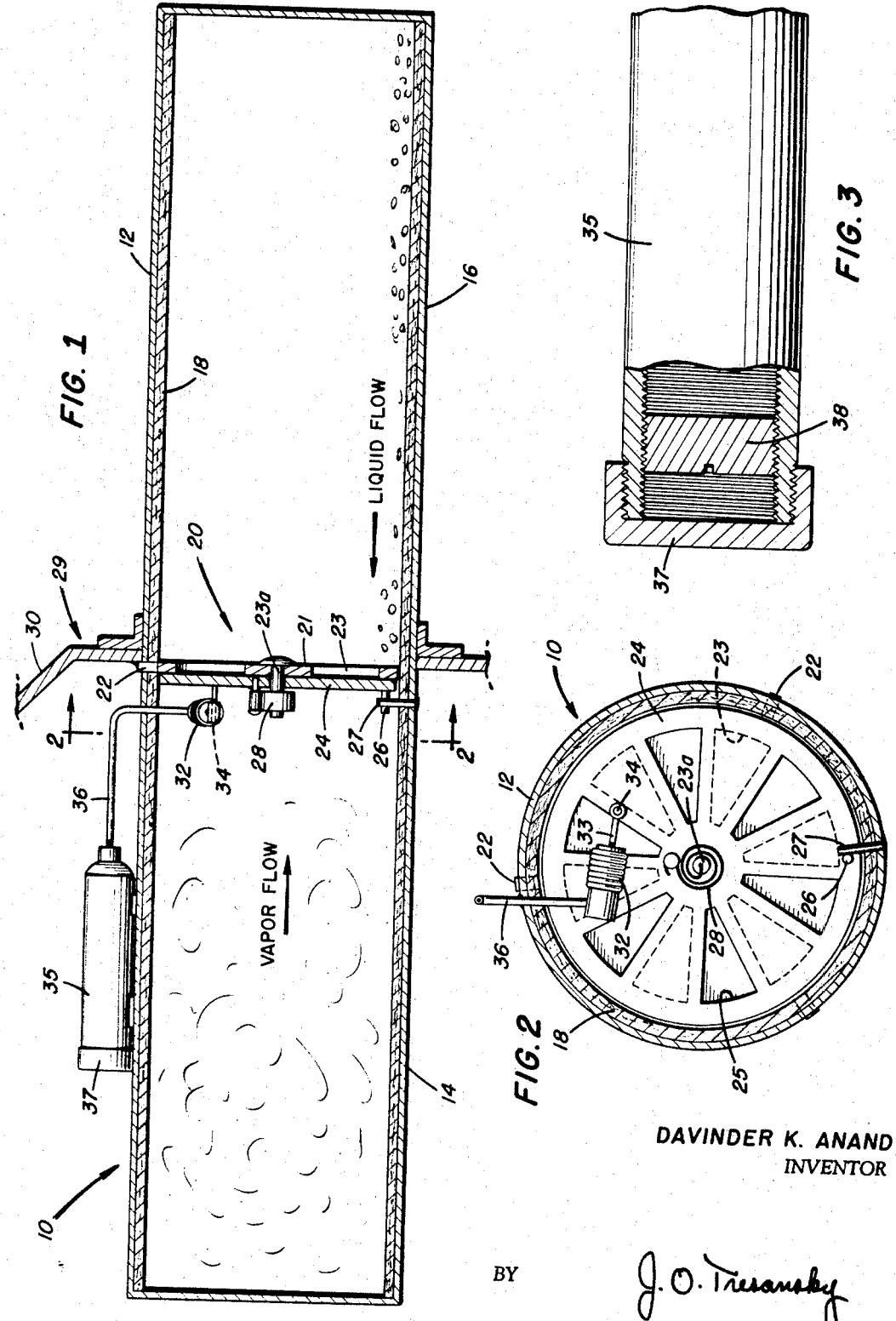

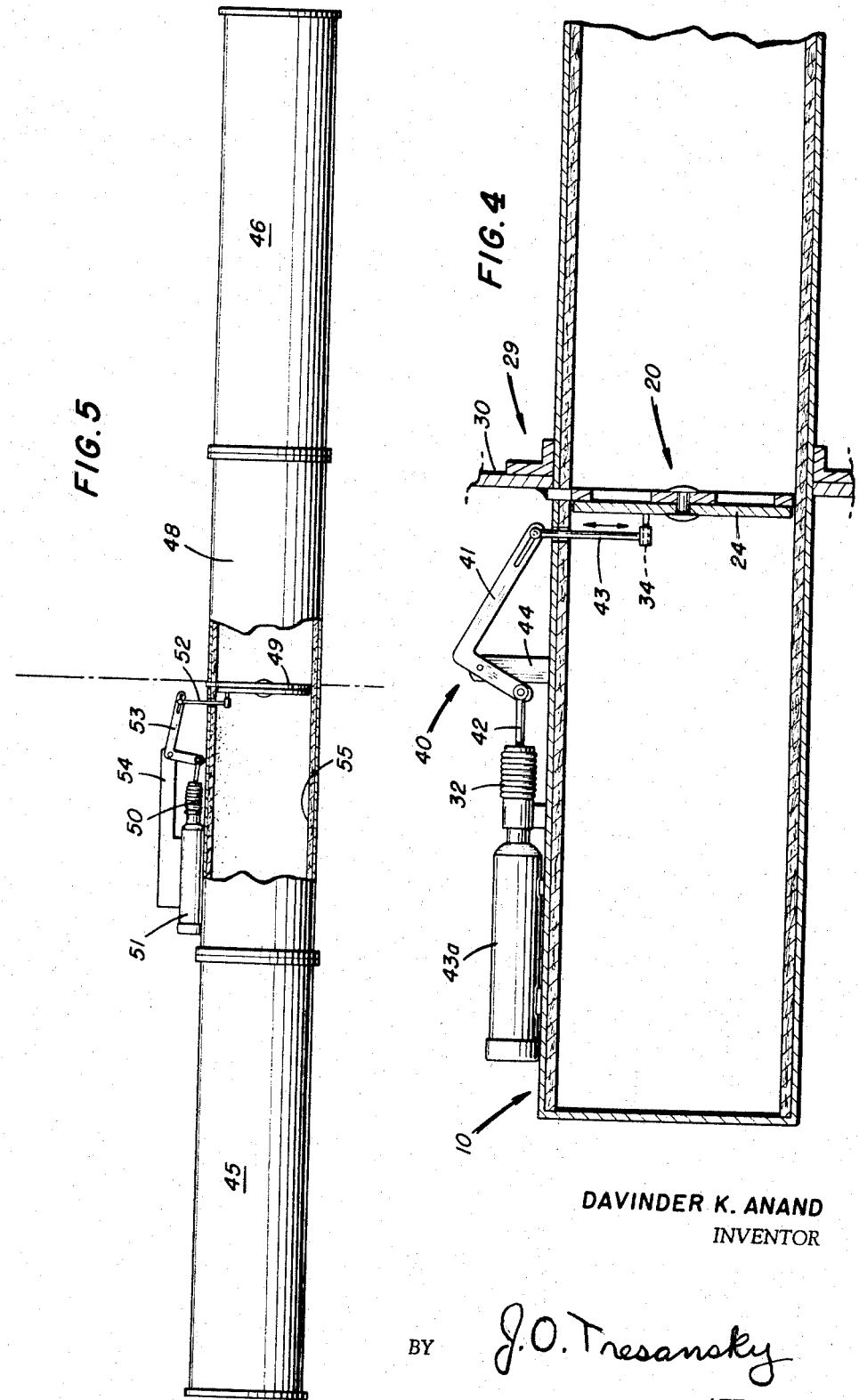

United States Patent Office 3,414,050
Patented Dec. 3, 1968

3,414,050
HEAT PIPE CONTROL APPARATUS
Davinder K. Anand, Beltsville, Md., assignor to the United States of America as represented by the Secretary of the Navy
Filed Apr. 11, 1967, Ser. No. 630,788
9 Claims. (Cl. 165—32)

ABSTRACT OF THE DISCLOSURE

The invention is a heat exchange device of the type known as a heat pipe, and is particularly useful for controlling the temperature within a space satellite.

A heat pipe is mounted in the outer wall of a satellite with an inner end portion exposed to heat within the satellite and an outer end exposed to free space. Vaporizable fluid is contained in the pipe and is caused to vaporize by heat from within the satellite. The vapor thus produced flows to the outer end portion of the pipe and heat is thus discharged into free space from the relatively cool outer end portion. At the same time, the vapor is condensed in the outer end portion of the pipe and the condensed vapor is returned to the inner end by a wick in the pipe.

For controlling the heat output a valve is used for regulating vapor flow in one embodiment of the invention. In another embodiment means is employed for interrupting the flow of condensed vapor back to the input end of the pipe.

---

The present invention relates generally to heat exchange devices of the type commonly referred to as heat pipes, and more particularly to improved heat pipe control apparatus.

Heat pipes have been found quite useful for stabilizing temperatures within space vehicles, one such heat pipe for that purpose having been disclosed in U.S. Patent No. 3,152,774, T. Wyatt, inventor, assigned to the U.S. Government.

Heat pipes operate to transfer heat from a relatively high temperature environment, such as would ordinarily be found within a space satellite or satellite component, to a relatively low temperature area, such as would be present outside such a satellite. Transfer of heat in a heat pipe is effected by movement of vapor, produced by heating liquid in the inner portion of the pipe which is contained in the satellite, into the outer portion of said pipe which is positioned exteriorly of said satellite, for radiation thereby. The outer portion of the heat pipe, being cooler, will condense the vapor and return it, as liquid, to the inner portion by capillary action, as by a wick, for revaporization and repetition of the cycle. If it is desired to "control" the heat pipe, such control may be effected either by varying the vapor flow through the pipe or by varying the flow of liquid through the wick, or both.

Objects of the present invention, therefore, include the provisions of control apparatus for regulating the discharge of heat from a heat pipe, for doing this with minimum disturbance of fluid flow through such pipe, and for controlling such heat discharge in a simple and efficient manner.

Other objects and features of the present invention will in part be pointed out as the description of the invention progresses and in part be obvious from the accompanying drawings, wherein:

FIG. 1 is an axial section of a heat pipe with the improved control mechanism therein;

FIG. 2 is a transverse section on the line 2—2 of FIG. 1;

FIG. 3 is a detail section, on a reduced scale and partially in elevation, showing the gas calibrating screw employed;

FIG. 4 is an axial section similar to FIG. 1 but showing a slightly modified control mechanism;

FIG. 5 is a side elevation, partly in section, illustrating a further modified embodiment of the invention;

FIG. 6 is an axial section showing a modification of the invention, wherein means is employed for controlling the return flow of liquid, produced by condensation of vapor at the output end of the heat pipe, to the heat input end of said pipe, said means being illustrated in flow interrupting position;

FIG. 7 is an axial section similar to FIG. 6 but showing the flow controlling means in a position permitting liquid flow;

FIG. 8 is a sectional view on the line 8—8 of FIG. 7; and

FIG. 9 is an enlarged detail section on the line 9—9 of FIG. 7.

Briefly, the invention constituting the subject matter of the present patent application comprises a heat pipe that includes a tubular body closed at both ends and having therein a sleeve of wicking material and a condensable liquid such as water, alcohol or Freon. One end portion of the heat pipe, i.e., the heat input end, is normally positioned within the body of a space vehicle such as a satellite. The other end portion of the heat pipe, which is the heat output end, projects from the satellite body into free space. Heat generated by operating electronics equipment in the satellite causes the liquid to vaporize and the vapor thus produced flows from the heat input end portion of the pipe to the heat output end portion thereof for discharging heat into free space and lowering the temperature of the interior of the satellite.

Since the outer end portion of the heat pipe will be cooler than the input end portion thereof, the heat conducting vapor will condense in said output end portion and will be returned, as liquid, to the inner end portion of the pipe for revaporization.

In order to maintain the satellite at a desired predetermined temperature, some means for controlling vapor or liquid flow is necessary. In one embodiment of the present invention a disk type damper or valve is employed for controlling vapor flow. In another embodiment of the invention means is utilized for interrupting liquid flow from the output end portion of the heat pipe to the input end thereof. In practice it has been found that the last mentioned control means is the most effective.

Referring now more particularly to the drawings and first to FIGS. 1, 2 and 3 thereof, a heat pipe is shown generally at 10. The heat pipe 10 is tubular, having a side wall 12, is closed at its inner and outer ends by end walls, and has input and output sections 14 and 16, respectively. Extending throughout the length of the heat pipe and lying adjacent the inner surface of the wall 12 thereof is a sleeve 18 of wicking material.

Mounted within the pipe 10 substantially medially of its ends is a control valve 20. The valve 20 includes a fixed disk 21 which is secured to the wall 12 by spaced studs 22 that extend through the sleeve 18 and which is formed with spaced apertures 23, and a movable disk 24 which is pivotally connected to the fixed disk by an axial pin 23a and includes spaced apertures 25 that are adapted to register with the apertures 23, when said disk 24 is moved by means to be described hereinafter. A stop 26 is provided near the rim of the disk 24 and is engageable with a pin 27 that projects radially inwardly from the wall 12 and through and beyond the sleeve 18. A spring 28, which surrounds the pin 23a, normally retains the disk with the stop 26 in engagement with the pin 27, in which condition the apertures 23 and 25 are out of registry.

As best seen in FIG. 1, the heat pipe 10 is mounted in a satellite 29, a wall of which is shown at 30, with the input section 14 within the satellite and with the output section 16 extending exteriorly of the satellite into free space. As shown, the valve 20 is positioned along the pipe 10 at a point immediately inwardly of the wall 30.

To actuate the valve 20 a bellows 32 having a rod 33 is mounted within the input section of the heat pipe and adjacent said valve, the rod 33 having its outer end connected to the movable disk 24 by a pin 34. The bellows 32 is connected to the outer end of a fluid supply tank 35, mounted on the exterior of the input section of the pipe 10, by a pipe 36. The tank 35 is closed at its inner end by a cap 37.

The tank 35 and the pipe 10 are each provided with a supply of condensable gas, for a purpose to be described hereinafter. As best seen in FIG. 3, the inner end portion of the tank 35 is internally threaded to receive a plug 38 which has a screwdriver slot therein, so that said plug may be shifted axially of the tank for varying the size of the tank and thus the amount of gas pressure that will be produced in said tank at a given temperature within the satellite.

In operation, heat produced within the satellite 29, such as by operating electronic equipment, impinges on the tank 35 and on the input section 14 of the heat pipe 10 and causes the condensible gas to boil and produce a vapor. The vapor in the input section of the pipe will move toward the output section 16. At the same time, vapor in the tank 35 will move into the bellows 32 for expanding the same, when the valve disk 24 will be shifted for bringing the apertures 25 thereof into registry with the apertures 23 of the fixed disk 21. Vapor in the input section 14 will thus be permitted to escape into the output section of the pipe 10. The vapor will in this manner conduct heat from the interior of the satellite. Vapor in the output section will, incident to discharging heat from the satellite, condense and the product of condensation will be returned to the input section of the pipe by the sleeve 18 of wicking material.

The embodiment of the invention shown in FIG. 4 is identical to that illustrated in FIGS. 1, 2 and 3, and functions in like manner, except that the bellows is placed outside of the heat pipe to render it more accessible for servicing. In FIG. 4 the same reference numerals have been used in FIGS. 1–3, where appropriate. As in FIG. 1, the heat pipe 10 is mounted in the wall 30 of the satellite 29 with substantially half of said pipe extending into free space. The control valve 20 is actuated by the bellows 32, mounted on the exterior of the pipe 10, by a linkage 40 which includes a bell-crank 41 and actuating rods 42 and 43. The actuating rod 42 is connected between the bellows 32 and the bell-crank 40, and the rod 43 is connected between said bell-crank and the pin 34 on the movable disk 24. A bracket 44 pivotally mounts the bell-crank 40 on the pipe 10. As will be obvious, motion of the bellows will be transmitted to the movable disk 24 through the rods 42 and 43, the bell-crank 41, and the pin 34. A tank 43a, similar to the tank 35, supplies gas to the bellows 32.

Reference is now made to FIG. 5 of the drawings, wherein a further modification of the invention is shown. The modification of FIG. 5 is quite similar to that of FIG. 4, differing in minor details and significantly in the provision of a separate heat pipe section to contain the control valve and its associated operating mechanism. In FIG. 5, heat pipe input and output sections are shown at 45 and 46, respectively, and are connected by a central section 48 in which is mounted a control valve 49 which is similar to the valve 20 in every respect.

The control valve 49 is operated by a bellows 50 that is mounted on a tank 51 that is similar to the fluid supply tank 35. Operation of the movable disk of the valve 49 is effected by a rod 52 and a bell-crank 53, the bell-crank being supported by a bracket 54 on the tank 51. A sleeve of wicking material 55 in the central section 48 cooperates with similar wicking (not shown) in the input and output sections 45 and 46. Operation of the embodiment of the invention shown in FIG. 5 is identical to that of the modifications shown in FIGS. 1–4.

Control of the output of a heat pipe may be effected by the apparatus described hereinabove, wherein vapor flow from the heat input section to the output section is regulated by a damper type valve, or by interrupting the flow of liquid, produced by condensation of vapor in the output half of the pipe, from said output half to the input half. Such a liquid flow interrupting arrangement forms the subject matter of the modification shown in FIGS. 6 through 9 of the drawings, now to be described.

Referring to FIGS. 6–9, the central portion of a heat pipe is shown generally at 60, the pipe 60 itself being similar to the heat pipe 10. Confronting portions of the input and output sections of the pipe are shown at 61 and 62, respectively. Positioned within the sections 61 and 62 are sleeves 63 and 64 of wicking material, the sleeves terminating with their confronting ends in spaced relation to define a gap 65.

Mounted in the side wall of the heat pipe 60 medially of the gap 65, as best seen in FIG. 8, is a Bourdon tube 66. The Bourdon tube has a terminal portion 67 suitably secured in the wall of the pipe, said portion 67 extending exteriorly of said pipe for connection to a fluid supply tank 68 which is similar to the tank 35 and contains condensable gas. Within the heat pipe 60 the Bourdon tube 66 extends throughout substantially the circumference of said pipe in spaced relation to the inner surface thereof. Positioned on the outer surface of the Bourdon tube is a coupling element 69 of wicking material similar to that of the sleeves 63 and 64. As will be seen in FIG. 6, the coupling element 69 is of such length that it will substantially fill the gap 65 when the Bourdon tube is supplied with vapor, in a manner to be described in more detail hereinafter. The opposite ends of the element will thus engage the confronting ends of the sleeves 63 and 64 and provide a capillary connection therebetween.

The operation of this embodiment of the invention will now be briefly described.

The heat pipe 60 contains a condensable gas which, when subjected to heat applied to the input section 61, as by operating electronic equipment in a satellite, will be forced toward the output section 62 which is located exteriorly of the satellite. Upon reaching the output section 62, which is cooler than the input section, the gas will condense and saturate the sleeve 64. The Bourdon tube, prior to the application of heat to the tank 68, will be contracted, as shown in FIG. 6, in which position the coupling element will be withdrawn from the gap 65 and the capillary connection between the sleeves of wicking material 63 and 64 will be broken. So long as the Bourdon tube remains contracted, there will be no return of condensed gas from the output section to the input section and the discharge of heat from the satellite will cease when all of the gas has moved into said output section. However, heat applied to the input section 61 is at the same time applied to the tank 68 for vaporizing the condensable gas therein. The vaporized gas will flow into the Bourdon tube and cause it to extend, for moving the coupling element into the gap 65, when the sleeves 63 and 64 will be connected and the liquid produced by condensation in the output section 62 allowed to return to the input section 61 for revaporization. The heat discharge cycle will then be repeated. When the interior of the satellite is colled to a desired predetermined temperature, the Bourdon tube 66 will again contract, for breaking the liquid circuit between the sleeves 63 and 64.

Obviously many modifications and variations of the present invention are possible in the light of the above teachings. It is therefore to be understood that within the scope of the appended claims the invention may be practiced otherwise than as specifically described.

What is claimed is:

1. Heat pipe control apparatus including, in combination with a unitary heat pipe having a heat input section and a heat output section, and a source of heat, said heat input section being exposed to said source of heat and said heat output section being projected into free space,
   a condensable fluid in the heat pipe and movable upon vaporization by heat from said source of heat toward the heat output section for condensation therein,
   wick means in the heat pipe for returning fluid condensed in the heat output section to the heat input section, and
   means in the heat pipe between the heat input and heat output sections and comprising relatively fixed and movable apertured disks, said movable disks being operable for controlling fluid flow in the pipe.

2. Heat pipe control apparatus as recited in claim 1, including additionally
   a central section positioned between said heat input and heat output sections and containing said means.

3. Heat pipe control apparatus as recited in claim 1, and further comprising,
   heat responsive means for shifting the movable disk with respect to the fixed disk whereby the apertures will be moved into or out of registry.

4. Heat pipe control apparatus as recited in claim 3, wherein
   said heat responsive means includes a source of fluid, a bellows connected with the source,
   and means operatively connecting the bellows with the movable apertured disk.

5. Heat pipe control apparatus as recited in claim 4, wherein
   said last mentioned means includes a bell-crank and an actuating rod.

6. In heat pipe control apparatus,
   a heat pipe having an input section and an output section,
   a fluid in the heat pipe,
   a sleeve of wicking material in each said input and output sections,
   said wicking material sleeves having confronting ends terminating in spaced relation to define a gap,
   and means movable with respect to the gap for controlling fluid flow between the sleeves of wicking material.

7. Heat pipe control apparatus as recited in claim 6, wherein
   said means comprises a coupling element of wicking material.

8. Heat pipe control apparatus as recited in claim 7, including additionally
   a Bourdon tube mounting said coupling element in the heat pipe, and
   a source of fluid for said Bourdon tube,
   said fluid when under pressure extending said coupling element to lie in said gap and engage confronting ends of said sleeves.

9. In heat pipe control apparatus,
   a heat pipe having input and output sections,
   spaced fluid conducting means in said sections,
   condensable fluid in the heat pipe and vaporizable by heat applied to said input section, said vapor moving from said input section to said output section for conducting heat to said output section, and
   movable fluid conducting means shiftable to a position engaging confronting ends of said first mentioned fluid conducting means for returning to said input section fluid condensed in said output section.

References Cited

UNITED STATES PATENTS

| 1,975,868 | 10/1934 | Schlumbohm | 165—32 |
| 2,010,431 | 8/1935 | Hulse | 165—105 X |
| 2,026,423 | 12/1935 | Fiene | 165—105 X |
| 2,028,260 | 1/1936 | Vernet | 165—105 X |
| 3,112,890 | 12/1963 | Snelling | 62—119 X |
| 3,229,759 | 1/1966 | Grover | 165—105 |

ROBERT A. O'LEARY, *Primary Examiner.*

A. W. DAVIS, JR., *Assistant Examiner.*